United States Patent [19]

Ohya et al.

[11] Patent Number: 4,883,693
[45] Date of Patent: * Nov. 28, 1989

[54] HEAT-SHRINKABLE LAMINATE TUBULAR FILM

[75] Inventors: Masaki Ohya; Yoshiharu Nishimoto, both of Iwaki, Japan

[73] Assignee: Kureha Kagaku Kogyo Kabushiki Kaisha, Tokyo, Japan

[*] Notice: The portion of the term of this patent subsequent to Mar. 22, 2005 has been disclaimed.

[21] Appl. No.: 130,528

[22] Filed: Dec. 9, 1987

Related U.S. Application Data

[63] Continuation-in-part of Ser. No. 675,307, Nov. 27, 1984, Pat. No. 4,732,795.

[30] Foreign Application Priority Data

Dec. 2, 1983 [JP] Japan ................................ 58-228116

[51] Int. Cl.⁴ ........................ B32B 27/08; B32B 27/34
[52] U.S. Cl. .................................. 428/34.9; 428/35.4; 428/213; 428/214; 428/475.8; 428/476.1; 428/476.3; 428/483; 428/518
[58] Field of Search ............. 428/36, 213, 214, 475.8, 428/476.1, 476.3, 476.9, 483, 518, 34.9, 35.4

[56] References Cited

U.S. PATENT DOCUMENTS

| | | | |
|---|---|---|---|
| 4,133,924 | 1/1979 | Seino et al. | 428/481 |
| 4,188,443 | 2/1980 | Mueller et al. | 428/483 |
| 4,289,830 | 9/1981 | Knott, II | 428/475.8 |
| 4,309,466 | 1/1982 | Stillman | 428/518 |

FOREIGN PATENT DOCUMENTS

2516067 5/1983 France ................................ 428/518

Primary Examiner—Thurman K. Page
Assistant Examiner—James J. Seidleck
Attorney, Agent, or Firm—Oblon, Spivak, McClelland, Maier & Neustadt

[57] ABSTRACT

Disclosed herein is a coextruded, biaxially stretched and laminated heat-shrinkable tubular film, comprising:

a gas-barrier layer of a copolymer of vinylidene chloride having a thickness, which is not more than 30% of the total thickness of the coextruded, biaxially stretched and laminated heat-shrinkable tubular film, of not less than 6 μm, outer layers of a polyolefin, at least one intermediate layer of a polyamide or a thermoplastic polyester, both of which show a crystal melting point of not more than 240° C., said intermediate layer having a thickness of 5 to 40% of the total thickness of the coextruded, biaxially stretched and laminated heat-shrinkable tubular film, and adhesive layers disposed between all or certain polymer layers, and the total thickness of the coextruded, biaxially stretched and laminated heat-shrinkable tubular film being in the range of 25 to 110 micrometers, the coextruded, biaxially stretched and laminated heat-shrinkable tubular film being produced by laminating and co-extruding the copolymer of vinylidene chloride, the polyolefin, polyamide or the thermoplastic polyester and the adhesive material, cooling, heating and stretching the resultant laminated tubular film.

7 Claims, 1 Drawing Sheet

HEAT-SHRINKABLE LAMINATE TUBULAR FILM

CROSS-REFERENCE TO RELATED APPLICATION

The present invention is a continuation-in-part of application Ser. No. 675,307, filed on Nov. 27, 1984, now U.S. Pat. No. 4,732,795.

BACKGROUND OF THE INVENTION

The present invention relates to a coextruded, biaxially stretched and laminated heat-shrinkable tubular film, comprising:

a gas-barrier layer of a copolymer of vinylidene chloride having a thickness, which is not more than 30% of the total thickness of the coextruded, biaxially stretched and laminated heat-shrinkable tubular film, of not less than 6 μm, outer layers of a polyolefin, at least one intermediate layer of a polyamide or a thermoplastic polyester, both of which show a crystal melting point of not more than 240° C., said intermediate layer having a thickness of 5 to 40% of the total thickness of the coextruded, biaxially stretched and laminated heat-shrinkable tubular film, and adhesive layers disposed between all or certain polymer layers, and the total thickness of the coextruded, biaxially stretched and laminated heat-shrinkable tubular film being in the range of 25 to 110 micrometers, the coextruded, biaxially stretched and laminated heat-shrinkable tubular film being produced by laminating and co-extruding the copolymer of vinylidene chloride, the polyolefin, polyamide or the thermoplastic polyester and the adhesive material, cooling, heating and stretching the resultant laminated tubular film.

More in detail, the present invention relates to a coextruded, biaxially stretched and laminated heat-shrinkable tubular film, comprising:

(1) a gas-barrier layer of a copolymer of vinylidene chloride having a thickness, which is not more than 30% of the total thickness of the coextruded, biaxially stretched and laminated heat-shrinkable tubular film, of not less than 6 μm, (2) outer layers prepared from at least one polymer selected from the group consisting of:

(i) a copolymer of ethylene and vinyl acetate having a crystal melting point ranging from 80° to 103° C., (ii) a linear low-density polyethylene having a crystal melting point ranging from 110° to 130° C., and (iii) a mixture of more than 0% and not more than 40% by weight of a lineat low-density polyethylene having a crystal melting point ranging from 110° to 130° C., not less than 60% and less than 100% by weight of a copolymer of ethylene and vinyl acetate having a crystal melting point ranging from 80° to 103° C., and (iv) a mixture of more than 40% by weight and less than 100% by weight of a linear low-density poly-ethylene of a density in the range of 0.915 to 0.930 and more than 0% by weight and less than 60% by weight of a copolymer of ethylene and vinyl acetate of a crystal melting point in the range of 80° to 103° C., the outer layers having a thickness of 40 to 92% of the total thickness of the coextruded, biaxially stretched and laminated heat-shrinkable tubular film, (3) at least one intermediate layer of a polyamide or a thermoplastic polyester, both of which show a crystal melting point of not more than 240° C., said intermediate layer having a thickness of 5 to 40% of the total thickness of the coextruded, biaxially stretched and laminated heat-shrinkable tubular film, and (4) adhesive layers disposed between all or certain polymer layers, each adhesive layer having a thickness of 0.5 to 5.0 μm, and the total thickness of the coextruded, biaxially stretched and laminated heat-shrinkable tubular film being in the range of 25 to 110 micrometers, said coextruded, biaxially stretched and laminated heat-shrinkable tubular film being produced by laminating and co-extruding the copolymer of vinylidene chloride, the polyolefin, polyamide or the thermoplastic polyester and the adhesive material, cooling, heating and stretching the resultant laminated tubular film.

For packaging the foodstuffs non-uniform and irregular shape, a method of heat-shrink packaging is generally applied, and since the thus packaged foodstuff should be preserved safely for a long time period, it is necessary that the packaging used in such a packaging is impermeable to gases, particularly to gaseous oxygen, in other words, the packaging material must have a gas-barrier property.

As the heat-shrinkable gas-barrier film for packaging the foodstuffs, a single film of a copolymer of vinylidene chloride (hereinafter referred to as VDC) has been utilized. However, because of the poor mechanical properties of the single film of VDC at low temperatures, a composite laminate film comprising a gas-barrier layer of VDC and an outer layer of polyolefin has been developed.

For example, U.S. Pat. No. 4,309,466 discloses a composite, flexible packaging film consisting essentially of an outer web of a balanced biaxially-oriented polyamide;

a middle web of metallized thermoplastic material, an inner web of heat-sealable polyolefin; and at least one of said outer and middle webs having a vinylidene chloride polymer coating thereon.

U.S. Pat. No. 4,133,924 discloses a heat shrinkable laminate film which comprises a heat shrinkable synthetic resin film and a low shrink film which forms creases or crepes when said laminate is heat shrunk, and which is laminated on the heat shrinkable film with an adhesive composition having low cohesive force and high melt flowability and an adhesive strength lower than the shrinking force of the heat shrinkable film.

French Patent No. 2516017 discloses a heat shrinkable laminated film comprising an inner layer of a gas impermeable resin comprising a vinylidene chloride copolymer or an ethylene/vinyl alcohol copolymer, an outer layer (A) made of a resin which is a copolymer (I) of ethylene and α-olefin having a density of 0.900–0.950 and a crystalline melting point of 110° to 130° C. or a mixture of more than 20 weight % of the copolymer (I) and less than 80 weight % of a copolymer (II) of ethylene and vinyl acetate having a crystalline melting point of 80° to 103° C., an outer layers (B) comprising a resin made from a crosslinked material formed from one of the copolymer (I) and/or the copolymer (II) by exposing the polymer to ionising radiation.

Also, European Patent No. 0051480 discloses laminate films for heat-shrink packaging foodstuffs comprising a center layer and two outermost layers with a respective adhesive layer between the center layer and each outermost layer, and being capable of exhibiting a rate of heat shrinkage at 90° C. of more than 15%, the center layer consisting of a copolymer (I) of vinylidene chloride and both the outermost layers consisting of from 20 to 70% by weight of a copolymer (II) of ethylene and an alphaolefin, the copolymer (II) having a crystalline melting point of 110° to 125° C., and from 80 to 30% by weight of a copolymer (III) of ethylene and vinyl acetate, the copolymer (III) having a crystalline melting point of 85° to 103° C., the content of copolymer (II) in the total amount of copolymers in both the outermost layers being less than 65% by weight.

U.S. Pat. No. 4,188,443 discloses a heat shrinkable, multi-layer, flexible, thermoplastic packaging film comprising:

(a) at least three layers of polymeric material;

(b) at least one of said layers being an inner layer and comprising a polymer selected from the group consisting of: (i) homopolymers, copolymers, and terpolymers of ethylene and (ii) blends of ethylene homopolymers or copolymers with butylene homopolymers or copolymers, said inner layer comprising 50% to 90% of the total thickness of said laminate;

(c) another of said layers comprising a polymer selected from the group consisting of polyesters and copolyesters, said layer being stretch oriented;

(d) said multi-layer film having shrink tension in the range from 100 to about 400 p.s.i.; and, (e) said film having a total thickness in the range between 0.1 mil and 2.0 mil.

Further, U.S. Pat. No. 4,289,830 discloses a multilayer packaging film structure comprising an outer structural polymer layer of nylon or a polyolefin with a modified polyolefin adhesive layer, a gas-barrier layer consisting essentially of ethylenevinyl alcohol polymer to which has been added an orthosubstituted phenol having a melting point below about 185° C. and a boiling point above about 125° C., an adhesive layer of a modified polyolefin, an inner structural layer of a polyolefin, and an inside heat sealable layer.

Also Japanese Patent Application Laid-Open (KOKAI) No. 58-128821 (1983) discloses a laminate film comprising a gas-barrier layer of a vinylidene chloride copolymer (hereinafter referred to as VDC) and outer layers of a copolymer of ethylene and vinyl acetate (hereinafter referred to as EVA), and the disclosed film has solved the problem of the poor mechanical properties at low temperatures. However, because of the lack of rigidity in such a film, such a laminate film cannot exhibit a satisfactory operational processability in packaging foodstuffs.

As a result of the present inventors' studies, the problem of the lack of rigidity has been solved by incorporating a layer of a polyamide or a thermoplastic polyester between the gas-barrier layer and the outer layer of polyolefin of the laminate film.

SUMMARY OF THE INVENTION

In a first aspect of the present invention, there is provided a coextruded, biaxially stretched and laminated heat-shrinkable tubular film, comprising:

(1) a gas-barrier layer of a copolymer of vinylidene chloride having a thickness, which is not more than 30% of the total thickness of the coextruded, biaxially stretched and laminated heat-shrinkable tubular film, of not less than 6 μm, (2) outer layers prepared from at least one polymer selected from the group consisting of:

(i) a copolymer of ethylene and vinyl acetate having a crystal melting point ranging from 80° to 103° C., (ii) a linear low-density polyethylene having a crystal melting point ranging from 110° to 130° C., (iii) a mixture of more than 0% and not more than 40% by weight of a linear low-density polyethylene having a crystal melting point ranging from 110° to 130° C., and not less than 60% and less than 100% by weight of a copolymer of ethylene and vinyl acetate having a crystal melting point ranging from 80° to 103° C., and (iv) a mixture of more than 40% by weight and less than 100% by weight of a linear low-density polyethylene of a density in the range of 0.915 to 0.930 and more than 0% by weight and less than 60% by weight of a copolymer of ethylene and vinyl acetate of a crystal melting point in the range of 80° to 103° C., said outer layers having a thickness of 40 to 92% of the total thickness of the coextruded, biaxially stretched and laminated heat-shrinkable tubular film, (3) at least one intermediate layer of a polyamide or a thermoplastic polyester, both of which show a crystal melting point of not more than 240° C., said intermediate layer having a thickness of 5 to 40% of the total thickness of the coextruded, biaxially stretched and laminated heat-shrinkable tubular film, and (4) adhesive layers disposed between all or certain polymer layers, each adhesive layer having a thickness of 0.5 to 5.0 μm, and the total thickness of the coextruded, biaxially stretched and laminated heat-shrinkable tubular film being in the range of 25 to 110 micrometers, said coextruded, biaxially stretched and laminated heat-shrinkable tubular film being produced by laminating and co-extruding the copolymer of vinylidene chloride, the polyolefin, polyamide or the thermoplastic polyester and the adhesive material, cooling, heating and stretching the resultant laminated tubular film.

BRIEF EXPLANATION OF DRAWING

Attached drawing.

DETAILED DESCRIPTION OF THE INVENTION

Figure 1:
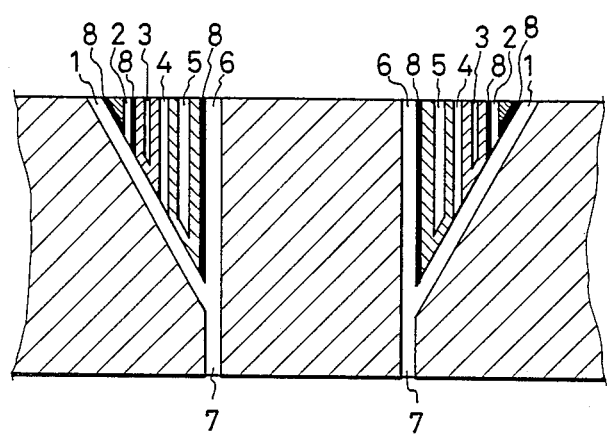
FIG. 1 is a vertical cross-sectional view of the annular die, particularly the junction part thereof where streams of all the layers of the film are assembled.

The heart of the present invention lies in a coextruded, biaxially stretched and laminated heat-shrinkable tubular film, comprising:

(1) a gas-barrier layer of a copolymer of vinylidene chloride having a thickness, which is not more than 30% of the total thickness of the coextruded, biaxially stretched and laminated heat-shrinkable tubular film, of not less than 6 μm, (2) outer layers prepared from at least one polymer selected from the group consisting of:

(i) a copolymer of ethylene and vinyl acetate having a crystal melting point ranging from 80° to 103° C., (ii) a linear low-density polyethylene having a crystal melting point ranging from 110° to 130° C., (iii) a mixture of more than 0% and not more than 40% by weight of a linear low-density polyethylene having a crystal melting point ranging from 110° to 130° C., and not less than 60% and less than 100% by weight of a copolymer of ethylene and vinyl acetate having a crystal melting point ranging from 80° to 103° C., and (iv) a mixture of more than 40 % by weight and less than 100% by weight of a linear low-density polyethylene of a density in the range of 0.915 to 0.930 and more than 0% by weight and less than 60% by weight of a copolymer of ethylene and vinyl acetate of a crystal melting point in the range of 80° to 103° C., said outer layers having a thickness of 40 to 92%, of the total thickness of the coextruded, biaxially stretched and laminated heat-shrinkable tubular film, (3) at least one intermediate layer of a polyamide or a thermoplastic polyester, both of which show a crystal melting point of not more than 240° C., said intermediate layer having a thickness of 5 to 40% of the total thickness of the coextruded, biaxially stretched and laminated heat-shrinkable tubular film, and (4) adhesive layers disposed between all or certain polymer layers, each adhesive layer having a thickness of 0.5 to 5.0 μm, and the total thickness of the coextruded, biaxially stretched and laminated heat-shrinkable tubular film being in the range of 25 to 110 micrometers, said coextruded, biaxially stretched and laminated heat-shrinkable tubular film being produced by laminating and co-extruding the copolymer of vinylidene chloride, the polyolefin, polyamide or the thermoplastic polyester and the adhesive material, cooling, heating and stretching the resultant laminated tubular film.

Since the gas-barrier layer of a VDC of the coextruded, biaxially stretched and laminated heat-shrinkable tubular film according to the present invention is relatively thick, the retention time of the VDC in a passage of the die is relatively short and accordingly, there is a merit of scarcely causing the thermal decomposition of the VDC in the production of the laminate tubular film.

Further, since the coextruded, biaxially stretched and laminated heat-shrinkable tubular film according to the present invention has at least one intermediate layer of the polyamide or the thermoplastic polyester having a specified thickness, the heat-shrinkable tubular film according to the present invention shows an adequate rigidity thereby overcoming the difficulty due to elongation of the laminated heat-shrinkable tubular film caused by the weight of the article to be packaged in the packaging operation. In addition, the coextruded, biaxially stretched and laminated heat-shrinkable tubular film according to the present invention exhibits more uniform stretchability than that of the laminate film disclosed in Japanese Patent Application Laid-Open (KOKAI) No. 58-128821 (1983). The gas-barrier property of the laminate tubular film according to the present invention is of course excellent.

The VDC used as the gas-barrier layer of the coextruded, biaxially stretched and laminated heat-shrinkable tubular film according to the present invention comprises a copolymer of from 65 to 95% by weight of vinylidene chloride and from 5 to 35% by weight of at least one comonomer copolymerizable with vinylidene chloride. As the comonomer copolymerizable with vinylidene chloride, for instance, vinyl chloride, acrylonitrile and, $C_1$ to $C_{18}$-alkyl acrylates may be mentioned. Of these comonomers, vinyl chloride is generally used. The VDC may contain a small amount of plasticizer(s) and/or stabilizer(s) according to necessity. These additives, i.e., the plasticizers and stabilizer, used in the present invention have been known by the persons skilled in the art and represented by, for example, dioctyl adipate and epoxidized soy-bean oil.

As has been stated, it is necessary that the thickness of the gas-barrier layer of the VDC is not less than 6 μm and is not more than 30%, preferably not more than 25% of the total thickness of the coextruded, biaxially stretched and laminated heat-shrinkable tubular film according to the present invention. In the case of below 6 μm, the retention time thereof in the passage of the die becomes so large in extruding the VDC with the polyamide or the thermoplastic polyester in lamination that the VDC decomposes, thereby having difficulty in the co-extrusion. On the other hand, in the case of over 30% of the total thickness of the laminate tubular film, the impact strength of the heat-shrinkable tubular film at low temperatures is reduced.

As the polyolefin of the outer layers, high density polyethylene, middle density polyethylene, low density polyethylene, ionomers, a copolymer of ethylene and vinyl acetate, a copolymer of ethylene and an ester of acrylic acid, a copolymer of ethylene and propylene, polypropylene, a copolymer of ethylene and α-olefin (the so-called linear low density polyethylene, hereinafter referred to as LLDPE), a polybutene and mixture thereof may be mentioned.

The preferable embodiments of the outer layers from the viewpoint of stretchability of the layer(s) are as follows.

(1) One of outer layers of a linear low-density polyethylene of a density in the range of 0.915 to 0.930, the other outer layer of (i) a linear low-density polyethylene of a density in the range of 0.915 to 0.930, or (ii) a mixture of not less than 60% by weight and less than 100% by weight of a copolymer of ethylene and vinyl acetate of a crystal melting point in the range of 80° to 103° C., and more than 0% by weight and not more than 40% by weight of a linear low-density polyethylene of a density in the range of 0.915 to 0.930.

(2) One of the outer layers of a mixture of more than 40% by weight and less than 100% by weight of a linear low-density polyethylene of a density in the range of 0.915 to 0.930 and more than 0% by weight and less than 60% by weight of a copolymer of ethylene and vinyl acetate of a crystal melting point in the range of 80° to 103° C., the other outer layer of (i) a linear low-density polyethylene of a density in the range of 0.915 to 0.930, (ii) a copolymer of ethylene and vinyl acetate of a crystal melting point in the range of 80° to 103° C., or (iii) a mixture of a copolymer of ethylene and vinyl acetate of a crystal melting point in the range of 80° to 103° C., and a linear low-density polyethylene of a density in the range of 0.915 to 0.930.

In addition, the total thickness of the layer(s) of the polyolefin is preferably in a range of from 40 to 92% of the total thickness of the coextruded, biaxially stretched and laminated heat-shrinkable tubular film according to the present invention.

The use of at least one polyamide or thermoplastic polyester layer as the intermediate layer(s) is the characteristic feature of the coextruded, biaxially stretched and laminated heat-shrinkable film according to the present invention, and by disposing the layer(s) of polyamide or thermoplastic polyester of an adequate rigidity and a favorable stretchability as intermediate layer, the stretchability and the rigidity of the laminate film comprising a VDC layer and the polyolefin layer(s) have been improved.

The laminate film disposed with each of two polyamide or thermoplastic polyester layers as intermediate layer between each of two outer layers of polyolefin and a core layer of VDC through the adhesive layers is preferable.

As the polyamide, a polymer having a crystal melting point of not more than 240° C., preferably of 220° C. is used and for instance, Nylon 6-66 (copolymer consisting of Nylon 6 and Nylon 66), Nylon 6,10 (polyhexamethylene sebacamide), Nylon 6-12 (a copolymer of ε-caprolactam and ring-opened laurinlactam), Nylon 11 (a condensate of 11-aminoundecanoic acid), Nylon 12 (a ring-open polymerizate of laurolactam), Nylon 6 (polycapramide), or a mixture of Nylon 6-66, Nylon 6, 10, Nylon -12, Nylon 11, Nylon 12 or Nylon 6 and a nylon comprising hexamethylenediamine and an aromatic dibasic acid may be exemplified.

As the thermoplastic polyester, a polymer having a crystal melting point of not more than 240° C., preferably not more than 220° C. or showing no crystal melting point is used and the thermoplastic polyester comprises the acid moiety selected from an aromatic dibasic acid and an aliphatic dibasic acid and the glycol moiety selected from aliphatic glycol, cycloaliphatic glycol and aromatic glycol. As such an esters, for instance, Vylon (made by TOYOBO Co., Ltd.) Hytel (made by Goodyear Co., Ltd.) and PET-G (made by Eastman Kodak Co., Ltd.) may be exemplified.

For reference, the "Crystal melting point" used in the present invention is the maximum temperature on a melting curve obtained by the determination on a specimen in an amount of 8 mg while using a differential scanning calorimeter (made by Perkin-Elmer Co., Model IB) at a rate of raising the temperature of 8° C./min.

In the case where the crystal melting point of the polyamide or the thermoplastic polyester is over 240° C., it is necessary to raise the extruding temperature, thereby the coextrusion of the polyamide or the thermoplastic polyester with VDC becomes difficult.

In the case where the coextruded, biaxially stretched and laminated heat-shrinkable tubular film according to the present invention contains not less than two intermediate layers of the polyamide or the thermoplastic polyester, the two layers may be the same to each other or different from each other. It is necessary that the thickness of such layer is from 5 to 40%, more preferably from 5 to 20% of the total thickness of the coextruded, biaxially stretched and laminated heat-shrinkable tubular film according to the present invention. In the case of the number of such layers of not less than 2, the total thickness of such layers is from 5 to 40% of the total thickness of the coextruded, biaxially stretched and laminated heat-shrinkable tubular film according to the present invention. On the other hand, in the case where the thickness of such layer(s) is below 5% of the total thickness of the coextruded, biaxially stretched and laminated heat-shrinkable tubular film according to the present invention, such layer(s) cannot contribute to the rigidity of the heat-shrinkable tubular film, and in the case of over 40%, the coextrusion with the VDC is difficult. From the viewpoint of co-extrudability with the VDC, the thickness of such layer(s) is more preferably not more than 20% of the total thickness of the coextruded, biaxially stretched and laminated heat-shrinkable tubular film according to the present invention.

As the adhesive material forming the adhesive layer, EVA containing from 13 to 28% by weight of vinyl acetate units, a copolymer of ethylene and an ester of acrylic acid containing from 13 to 28% by weight of the ester of acrylic acid, a modified copolymer of ethylene and an ester of acrylic acid with an unsaturated carboxylic acid and a material obtained by further modifying the thus modified copolymer with a metal may be exemplified. Of the above adhesive, the modified copolymer of ethylene and an ester of acrylic acid with the unsaturated carboxylic acid, and the material obtained by further modifying the thus modified copolymer of ethylene and an acrylic ester, with a metal are more preferable.

Any one of the above-mentioned adhesive layer is disposed between the polyolefin layer and the VDC layer, between the VDC layer and the polyamide or the thermoplastic polyester layer, and between the polyolefin and the polyamide or thermoplastic polyester layer.

The thickness of an adhesive layer if from 0.5 to 5 μm, preferably from 0.5 to 3 μm, and the total thickness of the heat shrinkable laminate tubular film is from 20 to 120 μm, preferably 25 to 110 μm.

In the preparation of the heat-shrinkable tubular film, a plurality of resins each of which constructs each of layers of the object laminate heat-shrinkable tubular film are respectively co-extruded from a common annular die connected to a plurality of extruders corresponding to a plurality of resins, thereby being extruded from the die as a laminated heat-shrinkable tubular film.

An assembling part of an example of such an annular die is schematically shown in FIG. 1 in which 7 is a passage of the assembled flow of the molten resins and the respective passages of the molten polyolefin, the molten VDC, the molten polyamide or the molten thermoplastic polyester, the molten polyolefin and the molten adhesive agent are shown by 1, 2, 4, 6 and 8. As shown in FIG. 1, it is preferable to provide the respective adiabatic spaces 3 and 5 on the both sides of the passage of the molten thermoplastic polyester. By the thus provided adiabatic spaces, even in the case where the thermoplastic polyester is extruded at a high temperature, since the direct heat transfer to the VDC layer therefrom can be prevented, the VDC which is relatively apt to be decomposed can be coextruded with the thermoplastic polyester or the polyamide. In the case of preparing a laminate flat film by using a T-die, the both end parts of the layer of the VDC coextruded with the polyamide layer or the thermoplastic polyester layer are apt to be decomposed and accordingly, such an operation is not favorable.

Although the order of lamination of the layers is optional as far as both of the outer layers are a polyolefin, the arrangement of the layers in the laminate tubular film is preferably in the following order from the outer layer to the inner layer:

polyolefin layer/adhesive layer/VDC layer/adhesive layer/polyamide layer or the thermoplastic resin layer/adhesive layer/polyolefin layer.

The thus extruded laminate tubular film is stretched biaxially following the conventional biaxial inflation method to form the coextruded, biaxially stretched and laminated heat-shrinkable tubular film according to the present invention.

Since the thus prepared, coextruded, biaxially stretched and laminated heat-shrinkable tubular film of the present invention shows gas-barrier property an adequate rigidity, and excellent stretchability, coextrudability it is suitably used in packaging particularly foodstuffs.

The present invention will be explained more in detail while referring to the following non-limitative examples.

EXAMPLES 1 to 5 and COMPARATIVE EXAMPLES 1 to 3

The VDC, the adhesive agent, the polyamide, the thermoplastic polyester and the polyolefin respectively shown in Table 1 were extruded from a plurality of extruders, respectively, and the thus extruded, molten resins were supplied, particularly in Examples 1 to 5, to the annular co-extruding die provided with the adiabatic spaces (3 and 5) shown in FIG. 1, thereby extruding the thus supplied molten resins as a laminate tubular film. The thus prepared laminate tubular film was cooled in a quenching bath at 15° to 25° C. to form a laminate tubular film of 120 mm in folded width and 540 μm in thickness. A small amount of soy-bean oil had been introduced into the inside space of the tubular film for the prevention of self-adherence of the inner layer when folded.

biaxially stretched laminate film was 350 mm in folded width and about 60 micrometer in thickness.

The same procedures were carried out in Comparative Examples 1 to 3 except for using a conventional circular coextruding die not provided with the adiabatic space as shown in FIG. 1 instead of the die shown in FIG. 1.

The physical properties of the resins used in Examples 1 to 5 and Comparative Examples 1 to 3 are shown in Table 1; the methods for determination of the physical properties of the films produced thereby are shown in Table 2 and the layer construction and the test data of the thus produced films are shown in Table 3.

TABLE 1

| | Properties of Resins used | | | |
|---|---|---|---|---|
| | Density | Melt index (g/10 min) | Crystal melting point (°C.) | Remarks |
| VDC[1] | — | — | — | |
| Polyamide (PA) | 1.13 | — | 200 | Nylon 6-66 copolymer |
| Thermoplastic polyester (PET-G) | 1.267 | — | not shown | Polyethylene telephthalate copolymer |
| LLDPE | 0.920 | 2.1 | 120 | Linear low density polyethylene ($T_f = 100°$ C.) |
| EVA-1 | 0.933 | 1.1 | 96 | Content of vinyl acetate units of 5.5% by weight |
| EVA-2 | 0.93 | 1.5 | 91 | Content of vinyl acetate units of 10% by weight |
| EVA-3 | 0.94 | 0.6 | 82 | Content of vinyl acetate units of 15% by weight |
| Mod-EEA (as adhesive[2]) | 0.940 | 1.8 | — | |

Notes
[1]A resinuous mixture of 100 parts by weight of a copolymer of vinylidene chloride (70% by weight) and vinyl chloride (30% by weight) and 1 part by weight of an epoxidized soy-bean oil.
[2]A modified copolymer of ethylene and an ester of acrylic acid, obtained by modifying the copolymer of ethylene and an ester of acrylic acid with an unsaturated carboxylic acid.

Then, the laminate tubular film was transferred through a hot water bath at a temperature shown in Table 3 at a transferring speed of 20 m/min and heated for about 12 sec while being pinched by the first pair of nip-rolls rotating at a speed of 20 m/min. Thereafter, the thus heated tubular film was taken out from the hot water bath and was stretched in a hot-air atomosphere of a temperature of 80° to 120° C. between the first pair of nip-rolls rotating at a speed of 20 m/min and the second pair of nip-rolls rotating at a speed of 60 m/min, into the longitudinal direction at a stretched ratio of 3 (i.e. 60/20=3) while simultaneously being stretched to the diametrical direction 3 times by air supplied into the inside space of the tubular film. The thus obtained,

TABLE 2

| Item | Method |
|---|---|
| Shrinkage in hot water | After immersing a specimen (10 cm square) of each of the laminate films at a relaxed state thereof in hot water at 90° C. for one min, the percentage of the length to the original length and the percentage of the width to the original width are shown, respectively as the averaged values of the test data on 20 specimens. |
| Gas-barrier property | The volume of gaseous oxygen (ml/m² of the film · 24 hours · atm) permeated through a specimen of each of the laminate films at 30° C. and relative humidity of 100%, respectively as the averaged values of the test data on 3 specimen. |

TABLE 3

| | Layer Construction of Tubular Film and Temperature of Hot Water Bath | | | | | | | |
|---|---|---|---|---|---|---|---|---|
| Examples and Comparative Examples | Layer Construction | | | | | | | Temperature of Hot Water Bath (°C.) |
| | 1st layer (μm) | 2nd layer (μm) | 3rd layer (μm) | 4th layer (μm) | 5th layer (μm) | 6th layer (μm) | 7th layer (μm) | |
| Ex. 1 | LLDPE (12) | Mod-EEA (1) | VDC (8) | Mod-EEA (1) | Polyamide (20) | Mod-EEA (1) | LLDPE (15) | 96 |
| Ex. 2 | LLDPE (12) | Mod-EEA (1) | VDC (8) | Mod-EEA (1) | PET-G (10) | Mod-EEA (1) | LLDPE EVA-1(2/8) (29) | 96 |
| Ex. 3 | LLDPE/ EVA-1(5/5) (7) | Mod-EEA (1) | VDC (8) | Mod-EEA (1) | PET-G (20) | Mod-EEA (1) | LLDPE/ EVA-1(5/5) (20) | 96 |
| Ex. 4 | LLDPE/ EVA-1(5/5) (9) | Mod-EEA (1) | VDC (10) | Mod-EEA (1) | PET-G (10) | Mod-EEA (1) | EVA-2 (34) | 96 |
| Ex. 5 | LLDPE/ EVA-1(6/4) (12) | Mod-EEA (1) | VDC (10) | Mod-EEA (1) | Polyamide (20) | Mod-EEA (1) | LLDPE (15) | 96 |

TABLE 3-continued

Layer Construction of Tubular Film and Temperature of Hot Water Bath

| Examples and Comparative Examples | 1st layer (μm) | 2nd layer (μm) | 3rd layer (μm) | 4th layer (μm) | 5th layer (μm) | 6th layer (μm) | 7th layer (μm) | Temperature of Hot Water Bath (°C.) |
|---|---|---|---|---|---|---|---|---|
| Comparat. Ex. 1 | EVA-3 (15) | N-polymer (1) | VDC (8) | N-polymer (1) | EVA-3 (6) | N-polymer (1) | EVA-3 (28) | 89 |
| Comparat. Ex. 2 | EVA-3 (12) | N-polymer (1) | VDC (4) | N-polymer (1) | Polyamide (15) | N-polymer (1) | EVA-3 (26) | — |
| Comparat. Ex. 3 | LLDPE/EVA-1*[1] (7) | N-polymer (1) | VDC (8) | N-polymer (1) | PET-G (27) | N-polymer (1) | LLDPE/EVA-2*[2] (15) | 98 |

TABLE 3-2

Physical Properties of Tubular Film

| Example or Comparative Example | Stretchability | Rigidity | Rate of heat-shrinkage (longitudinal/transversal) | Gas-barrier property | Coextrudability of tubular film |
|---|---|---|---|---|---|
| Example 1 | 1 | 1 | 18/17 | 52 | 1 |
| Example 2 | 1 | 1 | 27/28 | 59 | 1 |
| Example 3 | 1 | 1 | 28/27 | 58 | 1 |
| Example 4 | 1 | 1 | 28/29 | 48 | 1 |
| Example 5 | 1 | 1 | 25/25 | 47 | 1 |
| Comparative Example 1 | 2 | 3 | 50/53 | 60 | 1 |
| Comparative Example 2 | — | — | — | — | 3 |
| Comparative Example 3 | 3 | — | — | — | 2 |

(Notes)
(1) Stretchability:
1: Excellent, particularly excellently stretchable with unevenness of the thickness of the film of below 30%,
2: Inferior; although stretchable, with unevenness of the thickness of the film of from 30 to 50%,
3: Poor; although stretchable, without steadiness and with unevenness of the thickness of the film over 50%.
(2) Rigidity:
1: Excellent; defects in the packaging operation such as the elongation of the film due to the content scarcely occur,
2: Inferior; defects in the packaging operation occur some times,
3: Poor; defects in the packaging operation are apt to occur.
(3) Coextrudability of the layers into a composite laminate tube:
1: Coextrusion was possible continuously for more than 10 hours,
2: The time of sufficient, continuous extrusion was below 10 hours,
3: Coextrusion could be continued only less than one hour.

As are clearly seen in the results of Examples 1 to 5 shown in Table 3, the coextruded, biaxially stretched and laminated heat-shrinkable tubular film according to the present invention is excellent in stretchability and adequate rigidity, thereby excellent in processability in the packaging operation. In addition, the combination of the resins for producing the film was excellent in coextrudability.

On the other hand, although the resin combination of Comparative Example 1 was excellent for coextruding, the rigidity of the film was poor resulting in the poor processability in the packaging operation due to the absence of the layer of the polyamide or the thermoplastic polyester.

Although the resin combination of Comparative Example 2 includes the polyamide for the inner layer, because of the too thin layer of the VDC, decomposition of the VDC occurred to inhibit the continuous operation of coextrusion. In Comparative Example 3, because of the too large thickness of the layer of the thermoplastic polyester, the coextrudability was poor to cause the decomposition of the VDC. In addition, the coextruded film was poor in stretchability. By the above-mentioned demerits, any favorable laminate film could not be obtained.

What is claimed is:

1. A coextruded, biaxially stretched and laminated heat-shrinkable tubular film, comprising:
(1) a gas-barrier layer of a copolymer of vinylidene chloride having a thickness of not less than 6 μm, which is not more than 30% of the total thickness of the coextruded, biaxially stretched and laminated heat-shrinkable tubular film,
(2) outer layers prepared from at least one polymer selected from the group consisting of:
(i) a copolymer of ethylene and vinyl acetate having a crystal melting point ranging from 80° to 103° C.,
(ii) a linear low-density polyethylene having a crystal melting point ranging from 110 to 130° C.,
(iii) a mixture of more than 0% and not more than 40% by weight of a linear-low density polyethylene having a crystal melting point ranging from 110° to 130° C., and not less than 60% and less than 100% by weight of a copolymer of ethylene and vinyl acetate having a crystal melting point ranging from 80° to 103° C., and
(iv) a mixture of more than 40% by weight and less than 100% by weight of a linear low-density polyethylene of a density in the range of 0.915 to 0.930 and more than 0% by weight and less than 60% by weight of a copolymer of ethylene and vinyl acetate of a crystal melting point in the range of 80° to 103° C., said outer layers having a thickness of 40 to 92% of the total thickness of the coextruded, biaxially stretched and laminated heat-shrinkable tubular film, (3) at least one intermediate layer of a polyamide or a thermoplastic polyester, both of which show a crystal melting point of not more than 240° C., said intermediate layer having a thickness of 5 to 40% of the total thickness of the coextruded, biaxially stretched and laminated heat-shrinkable tubular film, and (4) adhesive layers disposed between all or certain polymer layers, each adhesive layer having a thickness of 0.5 to 5.0 μm, and the total thickness of the coextruded, biaxially stretched and laminated heat-shrinkable tubular film being in the range of 25 to 110 μm said coextruded, biaxially stretched and laminated heat-shrinkable tubular film being produced by laminating and co-extruding the copolymer of vinylidene chloride, the polyolefin, polyamide or the thermoplastic polyester and the adhesive material, cooling, heating and stretching the resultant laminated tubular film.

2. A coextruded, biaxially stretched and laminated heat-shrinkable tubular film according to claim 1, wherein one of the outer layers is a linear low-density polyethylene of a density in the range of 0.915 to 0.930, and the other outer layer of (i) a linear low-density polyethylene of a density in the range of 0.915 to 0.930, or (ii) a mixture of not less than 60% by weight and less than 100% by weight of a copolymer of ethylene and vinyl acetate of a crystal melting point in the range of 80° to 103° C., and more than 0% by weight and not more than 40% by weight of a linear low-density polyethylene of a density in the range of 0.915 to 0.930.

3. A coextruded, biaxially stretched and laminated heat-shrinkable tubular film according to claim 1, wherein one of the outer layers of a mixture is more than 40% by weight and less than 100% by weight of a linear low-density polyethylene of a density in the range of 0.915 to 0.930 and more than 0% by weight and less than 60% by weight of a copolymer of ethylene and vinyl acetate of a crystal melting point in the range of 80° to 103° C., and the other outer layer is (i) a linear low-density polyethylene of a density in the range of 0.915 to 0.930, (ii) a copolymer of ethylene and vinyl acetate of a crystal melting point in the range of 80° to 103° C., or (iii) a mixture of a copolymer of ethylene and vinyl acetate of a crystal melting point in the range of 80° to 103° C., and a linear low-density polyethylene of a density in the range of 0.915 to 0.930.

4. The coextruded, biaxially stretched and laminated heat-shrinkable tubular film according to claim 1, wherein the thickness of the gas-barrier layer is not less than 6 μm and not more than 25% of the total thickness of the coextruded, biaxially stretched and laminated heat-shrinkable tubular film, the thickness of the outer layer is the range of 40 to 92% of the total thickness of the coextruded, biaxially stretched and laminated heat-shrinkable tubular film, the thickness of the intermediate layer(s) of a polyamide or a thermoplastic polyester is in the range of 5 to 20% of the total thickness of the coextruded, biaxially stretched and laminated heat-shrinkable tubular film, and the thickness of each adhesive layer is 0.5 to 3.0 μm.

5. The coextruded biaxially stretched and laminated heat-shrinkable tubular film according to claim 1, wherein the comonomer copolymerizable with vinylidene chloride is vinyl chloride, acrylonitrile, or $C_1$-$C_{18}$-alkyl acrylate.

6. The coextruded, biaxially stretched and laminated heat-shrinkable tubular film according to claim 1, wherein said polyamide is Nylon 6-66 (a copolymer of ε-caprolactam and hexamethyleneadipamide), Nylon 6,10 (polyhexamethylene sebacamide), Nylon 6-12 (a copolymer of ε-caprolactam and ring-opened laurinlactam), Nylon 11 (polyundecaneamide), Nylon 12 (a polymer of ring opened laurinlactam), Nylon 6 (polycapramide), or a mixture of Nylon 6-66, Nylon 6,10, Nylon 6-12, Nylon 11, Nylon 12 or Nylon 6 and a Nylon comprising hexamethylenediamine and an aromatic dibasic acid.

7. The coextruded, biaxially stretched and laminated heat-shrinkable tubular film according to claim 1, wherein said polyester is a polymer prepared by condensing an aliphatic dibasic acid or an aromatic dibasic acid with an aliphatic glycol, a cycloaliphatic glycol or an aromatic glycol.

* * * * *

UNITED STATES PATENT AND TRADEMARK OFFICE
CERTIFICATE OF CORRECTION

PATENT NO. : 4,883,693

DATED : NOVEMBER 28, 1989

INVENTOR(S) : MASAKI OHYA ET AL

It is certified that error appears in the above-identified patent and that said Letters Patent is hereby corrected as shown below:

Column 13, line 26, change "the other outer layer of" to --the other outer layer is--.

Signed and Sealed this

Sixth Day of August, 1991

*Attest:*

HARRY F. MANBECK, JR.

*Attesting Officer*  *Commissioner of Patents and Trademarks*